United States Patent [19]

Gargiulo

[11] Patent Number: 5,213,727
[45] Date of Patent: May 25, 1993

[54] METHOD FOR INSTALLING A PIPE LINER
[75] Inventor: Joseph L. Gargiulo, Colts Neck, N.J.
[73] Assignee: American Pipe & Plastics, Inc., Binghamton, N.Y.
[21] Appl. No.: 709,635
[22] Filed: Jun. 3, 1991
[51] Int. Cl.$^5$ .................. B29C 63/20; B29C 63/34
[52] U.S. Cl. .................. 264/40.3; 138/97; 156/287; 156/294; 264/40.6; 264/516; 264/267; 264/36; 264/343; 264/DIG. 65
[58] Field of Search .................. 138/97, 98; 264/576, 264/36, 269, 173, 40.3, 40.6, 40.5, 343, DIG. 65; 156/287, 294, 295, 87

[56] References Cited

U.S. PATENT DOCUMENTS

| 2,695,255 | 11/1954 | Avery . | |
|---|---|---|---|
| 3,720,557 | 3/1973 | Longoni et al. | 264/173 |
| 3,758,361 | 9/1973 | Hunter | 156/287 |
| 4,867,921 | 9/1989 | Steketee, Jr. | 264/269 |
| 4,950,446 | 8/1990 | Kinumoto et al. | 264/269 |
| 4,956,041 | 9/1990 | Miyazaki et al. | 264/516 |
| 4,985,196 | 1/1991 | Ledoux et al. | 264/269 |

FOREIGN PATENT DOCUMENTS

| 0291011 | 11/1988 | European Pat. Off. . | |
|---|---|---|---|
| 0298125 | 1/1989 | European Pat. Off. . | |
| 3732694 | 4/1989 | Fed. Rep. of Germany . | |
| 3904524 | 8/1990 | Fed. Rep. of Germany . | |
| 1394807 | 3/1965 | France . | |
| 58-88281 | 5/1983 | Japan . | |
| 714105 | 8/1954 | United Kingdom . | |
| 1205170 | 9/1970 | United Kingdom . | |
| 2018384 | 10/1979 | United Kingdom . | |
| 2089461 | 6/1982 | United Kingdom | 138/97 |
| 2188695 | 10/1987 | United Kingdom . | |
| 87/04226 | 12/1986 | World Int. Prop. O. . | |

Primary Examiner—Jeffery Thurlow
Assistant Examiner—Mathieu Vargot
Attorney, Agent, or Firm—Cumpston & Shaw

[57] ABSTRACT

A process for installing a liner in a generally horizontal pipe section includes the steps of: providing a hollow generally cylindrical folded pipe liner; pulling the folded liner through the pipe section leaving end sections of the liner extending from the upstream end and the downstream end of the pipe; pulling an air hose and a steam hose through the folded liner from the downstream end to the upstream end; providing a floating plug assembly including at least two disk shaped expanders; attaching the steam hose to the floating plug assembly downstream of the disk shaped expanders; attaching the air hose to the floating plug assembly upstream of the disk shaped expanders; inserting the floating plug assembly into the liner at the upstream end; and providing steam to the steam hose and cooling air to the air hose, while pulling the floating plug assembly through the liner to progressively heat the liner to a softening point downstream of the disk shaped expanders, and expand the liner to fill the pipe and cool the expanding liner upstream of the disk shaped expanders.

8 Claims, 4 Drawing Sheets

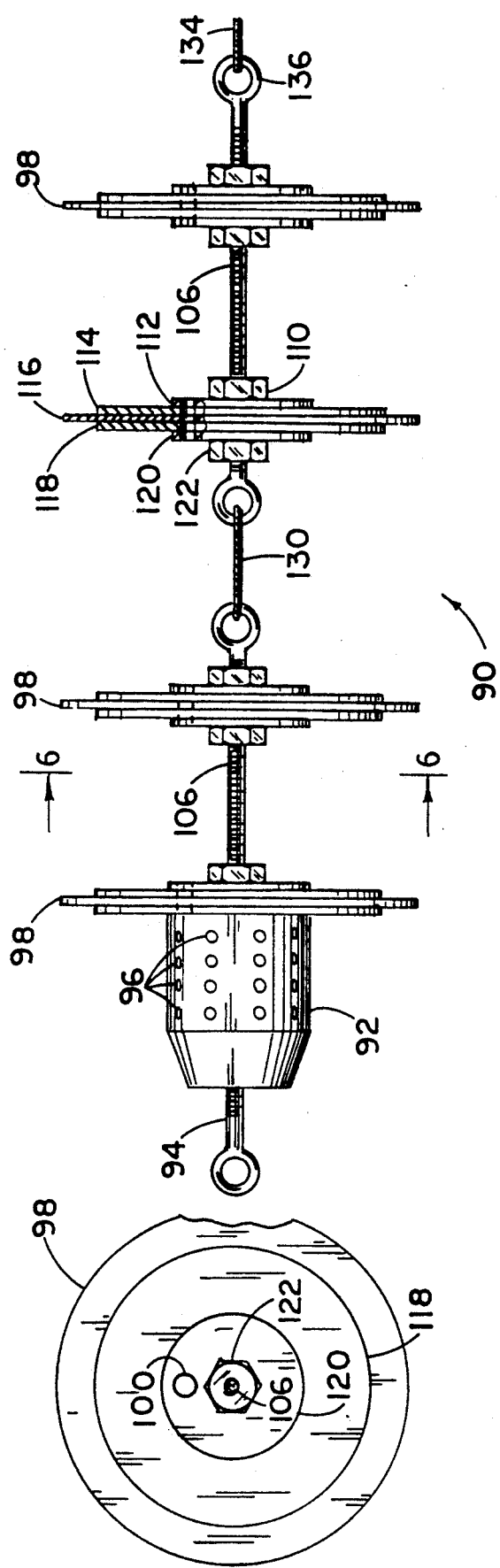

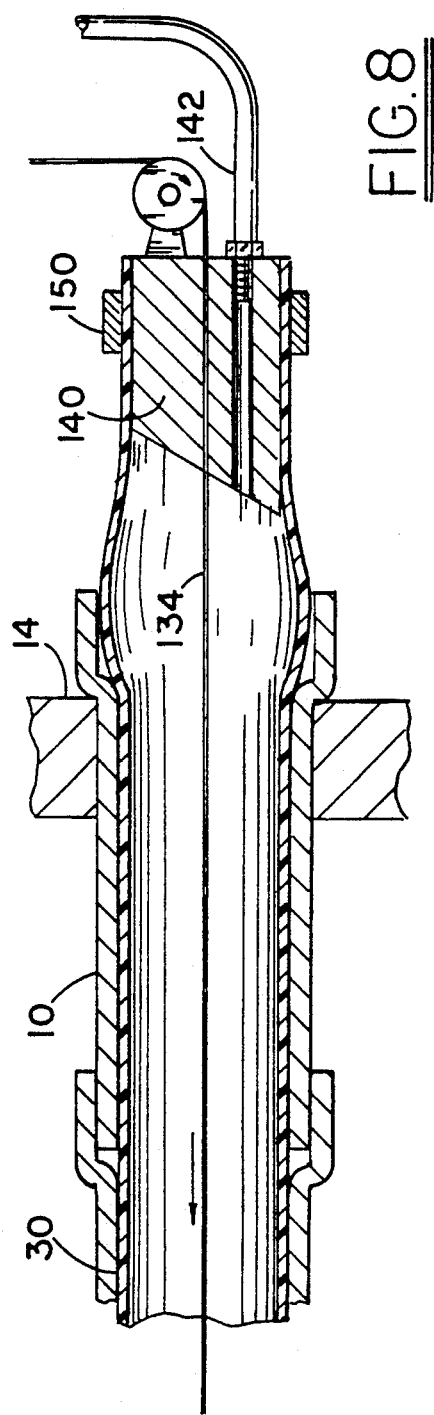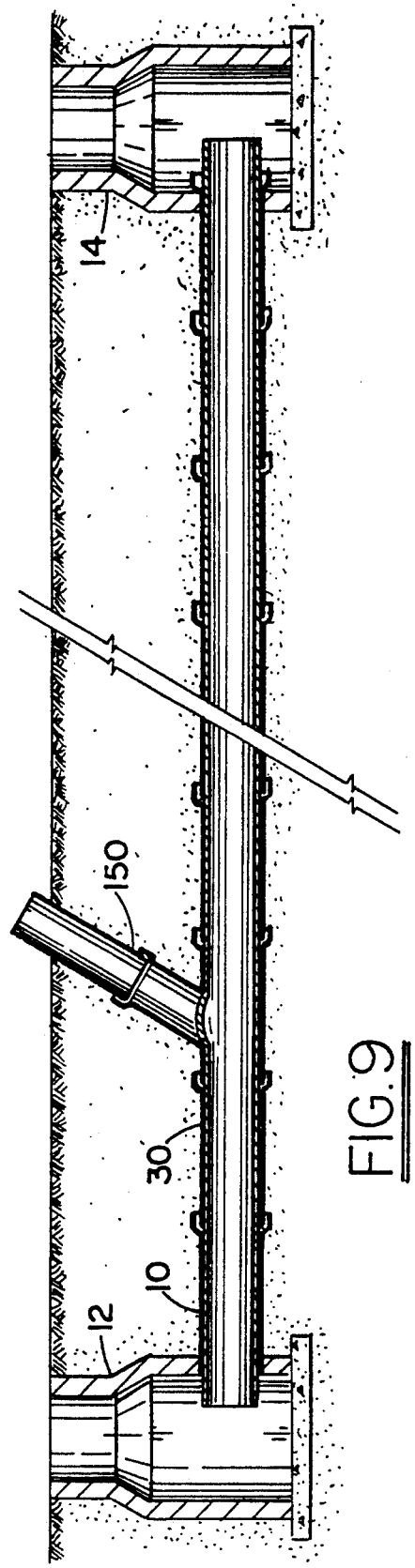

METHOD FOR INSTALLING A PIPE LINER

BACKGROUND OF THE INVENTION

1. Field of the Invention

This invention relates generally to a method and apparatus for lining horizontal pipe sections, and more particularly to such a method and apparatus that are particularly suited to lining aging sections of sewer pipe extending between adjacent manholes to reduce leakage, due to cracking and the like, and to extend the useful life of such pipe sections.

2. Description of the Related Art

Methods and apparatus for lining horizontal sections of sewer pipe are known, for example, from U.S. Pat. No. 4,985,196, and the references referred to therein. However, these known methods are not entirely satisfactory for a number of reasons, including, for example, the problem that we shall refer to as blistering. In accordance with the known processes, a pipe liner is drawn into a pipe section in a reduced cross section form, most commonly folded into a generally U-shape. This allows the entire lining section to be drawn easily through a sewer pipe section. The lining is then simultaneously softened and expanded by sealing one end, and introducing pressurized steam or other heated fluid into the other end. As the lining expands, it conforms to the inside surface of the sewer pipe section, and expands to a slightly larger diameter just adjacent the ends of the section. In accordance with the method and apparatus described in the aforementioned U.S. Pat. No. 4,985,196, the liner is formed from thermoplastic material having shape memory characteristics, such that the liner has an elastic memory actuable above a certain temperature. The liner is selected to have an outside diameter approximately equal to the inside diameter of the pipe to be lined. The liner is deformed into the generally U-shaped cross section at a temperature at least equal to the memory activation temperature, and cooled to fix the liner in the temporarily deformed reduced cross section shape. After the deformed liner has been inserted into the pipe, it is reheated to a temperature at least equal to the memory activation temperature, and the liner returns to its original cylindrical shape.

It is a principal object of the methods and apparatus of the prior art, as well as this invention, to reline existing sewer pipe sections in situ. Existing sewer pipe sections may have residual effluents present that must be removed prior to installing a liner. While techniques are known for cleaning the sewer pipe sections before installing liners. These methods may not be entirely successful. Further, lateral service connections from the sewer pipe to adjacent residences or businesses are normally spaced along the length of the pipe, and if effluents are inadvertently introduced through such laterals into the pipe during the installation process, a small amount of fluid may become trapped between the liner and the interior surface of the pipe. Such residual fluids cause the liner to bulge inwardly from the pipe wall, forming a blister.

SUMMARY OF THE INVENTION

The present invention has as an object to provide a method and apparatus for installing a liner in an existing sewer pipe section that minimizes the formation of such blisters. Further, the present invention aims to provide a method and apparatus for installing a liner that are relatively easy to implement in the field, use durable components, and provide a consistently satisfactory installation in the face of varying existing conditions within the pipe prior to lining.

Briefly stated, and in accordance with a presently preferred embodiment of the invention, a process for installing a liner in a generally horizontal pipe section includes the steps of: providing a hollow generally cylindrical folded pipe liner having a reduced cross section sized to allow the liner to be slidably drawn into the pipe section from an upstream end to a downstream end; pulling the folded liner through the pipe section leaving end sections of the liner extending from the upstream end and the downstream end of the pipe; snaking a pull wire through the liner; pulling an air hose and a steam hose through the folded liner from the downstream end to the upstream end; providing a floating plug assembly including at least two disk shaped expanders; attaching the steam hose to the floating plug assembly downstream of the disk shaped expanders; attaching the air hose to the floating plug assembly upstream of the disk shaped expanders; inserting the floating plug assembly into the liner at the upstream end; and providing steam to the steam hose and cooling air to the air hose, while pulling the floating plug assembly through the liner to progressively heat the liner to a softening point downstream of the disk shaped expanders, and expand the liner to fill the pipe and cool the expanding liner upstream of the disk shaped expanders.

The novel aspects of the invention are set forth with particularity in the appended claims. The invention itself, however, together with further objects and advantages thereof may be more fully appreciated by reference to the following detailed description of the invention, taken in connection with the accompanying drawings, in which:

BRIEF DESCRIPTION OF THE DRAWINGS

FIG. 6 is a front elevation of a disk shaped expander in accordance with this invention;

FIG. 7 is a side elevation of a floating plug assembly comprising four disk shaped expanders, and a cone shaped steam head;

FIG. 8 is an enlarged sectional view of the upstream end of a sewer pipe showing a sealing plug in place; and FIG. 9 is a cross section of a completed installation in accordance with the invention.

DESCRIPTION OF THE PREFERRED EMBODIMENTS

Figure 1:
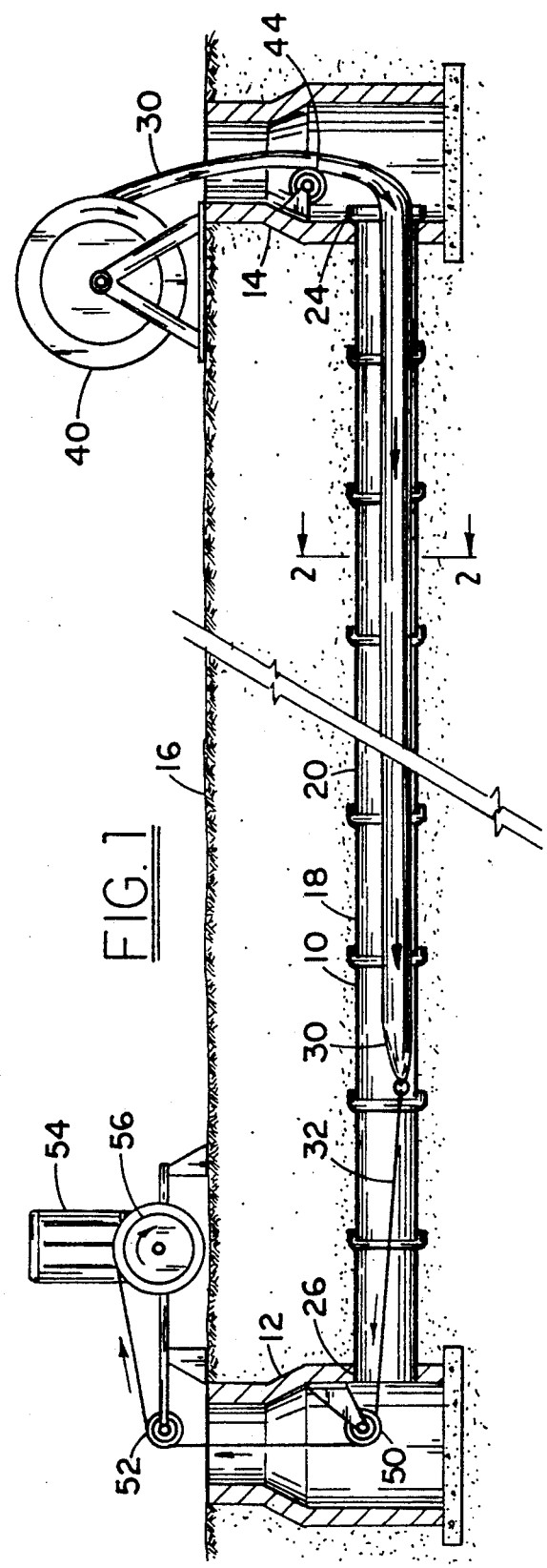
FIG. 1 is a diagrammatic view, partly in section, of an existing sewer pipe section extending between two manholes, showing a liner in accordance with this invention and during process of installation.

Referring now to FIG. 1, a horizontal sewer pipe section 10 extends between two adjacent manholes, 12 and 14 buried beneath the surface 16 of the ground. It will be understood that further pipe sections, not shown, will extend from the illustrated manholes to further adjacent manholes, to form a sewer pipe network. Ordinarily, the sewer pipe section between the adjacent manholes is formed from a plurality of sewer pipe segments 18, 20 that may be made from hardened or baked clay, or other similar materials. Over time, the pipe sections may crack and roots or the like may enter the pipe section, inhibiting the flow of effluents therethrough. Replacing the pipe sections by digging them up and substituting new sections is both time consuming and expensive, and may disrupt sewer service for an extensive period of time. Relining the pipe section is a greatly preferred method for restoring degraded pipe sections to service and extending their useful life.

Prior to beginning the installation of a pipe liner in accordance with this invention, the existing sewer pipe 10 is cleaned as thoroughly as possible by known methods, and inspected to determine and record the locations of all lateral service connections within the pipe. Various remotely controlled camera assemblies are available for inspection, both before and after cleaning. Cleaning itself may be accomplished through the use of remotely controlled augers and saws that are either pulled or moved under their own power along the length of the pipe.

Although the horizontal sewer pipe section 10 is preferably inclined somewhat from an upstream end 24 to a downstream end 26 to promote drainage, and although cleaning prior to installation of the pipe removes substantially all residual materials from the inside of the pipe, there may be a small amount of residual liquid present, or additional liquids may be introduced from the lateral service feeders. In order to avoid overly complicating the drawing, no such lateral figures are shown in FIG. 1, but an exemplary lateral is illustrated in FIG. 9.

Prior to installing the pipe liner 30, a pull wire 32 is snaked through the pipe section from the downstream end 26 to the upstream end 24. The pull wire 32 can be threaded through the pipe by any convenient manner, most preferably by attaching it to the cleaning or inspecting apparatus during one of those operations or by attaching it to a parachute device and vacuuming it through the pipe.

A supply reel 40 of coiled prefolded liner 30 is provided at the upstream end. Preferably, an idler roller 44 is installed within the manhole 14, to guide the liner 30 into the upstream end 24 of the pipe 10. The liner itself is preferably a polymeric material, such as polyvinyl chloride.

Figure 2:
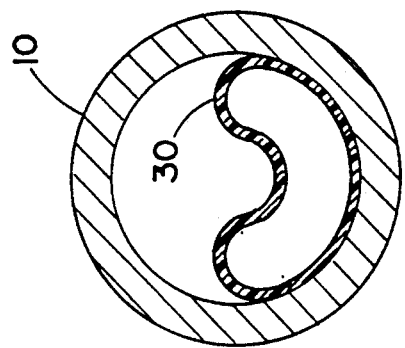
FIG. 2 is a cross section taken along lines 2—2 of FIG. 1, showing the shape of the liner and the pipe section.

The pipe liner 30 is preformed into a generally U-shaped configuration, as illustrated most clearly in FIG. 2, before or while being wound on the supply reel 40. The end of the coiled liner is preferably taper cut to avoid snagging during installation. The pull wire 32 is attached to the folded liner by a ring assembly 46 and shackle 48, for example, as shown in FIG. 3, prior to being drawn into the upstream end 24 of the pipe 10.

Alternatively, to reduce concentrated stress on the liner, the cable may be woven to the liner through preferably four drilled holes and secured.

The pull wire 32 is preferably trained around guiding pulleys 50, 52 within and adjacent the downstream manhole 12, and leading to a pulling engine 54 illustrated schematically, as located above the downstream manhole 12. The pull wire 32 is progressively wound around a pulling drum 56, as the liner is drawn through the pipe section 10.

Figure 3:
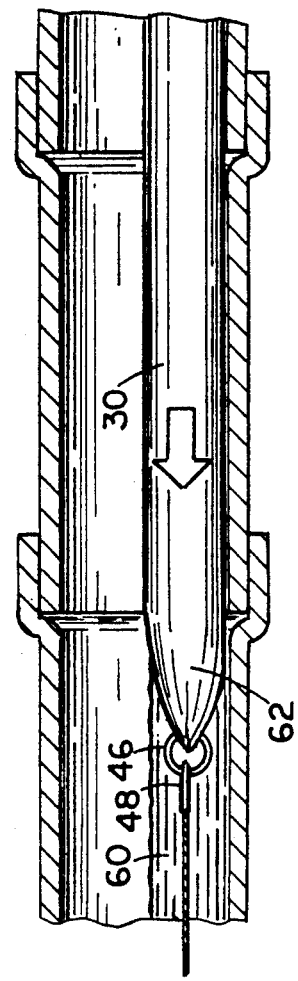
FIG. 3 is an enlarged sectional view of the liner being drawn into the pipe, as shown in FIG. 1.

As shown in FIG. 3, a substantial amount of effluent may accumulate in front of the leading end 62 of the liner 30, during installation. Because of the inclination of the pipe section 10, most of this effluent will run out into the downstream manhole 12 and it will be appreciated that the amount of effluent 60 shown in FIG. 3 is exaggerated, to make its presence clear.

Preferably, when the coil of liner 30 is especially rigid because either of its formulation or because of cold ambient conditions, the pipe is preheated prior to uncoiling from drum 40. The same source of steam, as is used subsequently during installation, or another source of steam, may be employed. In the alternative, the pipe may be simply sprayed with hot water.

The coil of liner is preferably steam heated through a water hose type coil to allow the liner to be unreeled while being steamed, to keep it soft.

Figure 4:
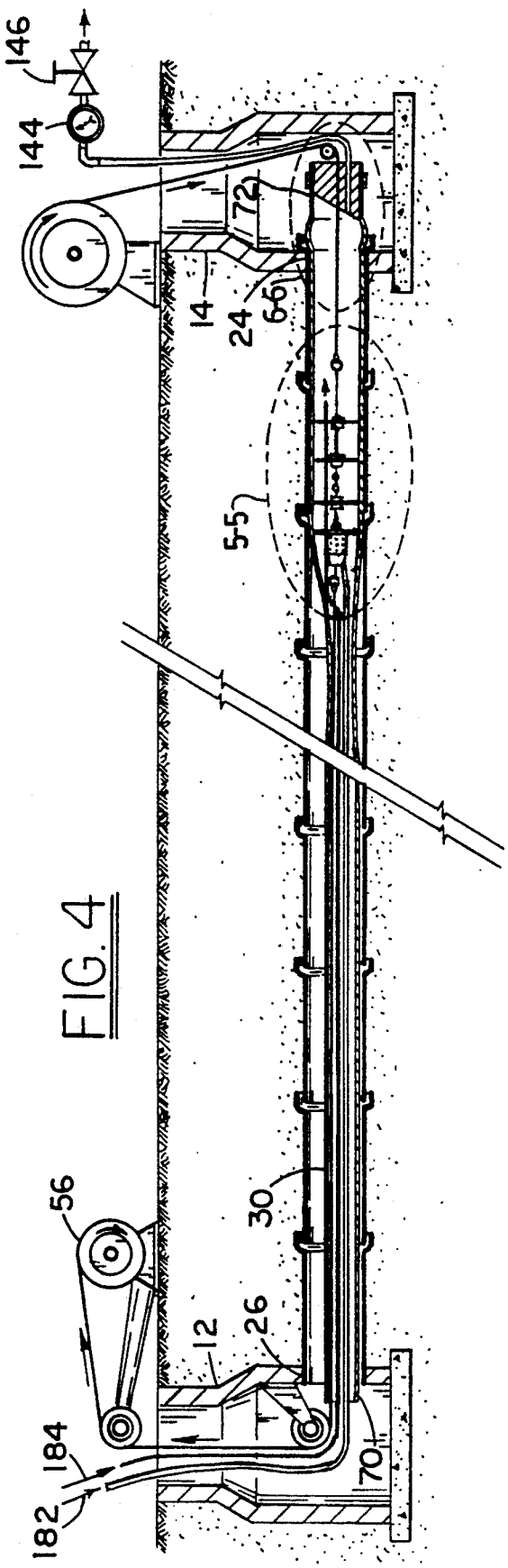
FIG. 4 is a side view, partly in section, showing how the liner is expanded in situ within the horizontal pipe section.

After the liner 30 has been pulled completely through the horizontal pipe section 10, the ends 70, 72 are trimmed to leave a short section extending beyond the upstream and downstream ends of the sewer pipe, as shown in FIG. 4. The same or another pull wire 74 is threaded through the liner 30, preferably from a downstream end 26 to the upstream end 24. In like manner, an air hose 80 and a steam hose 82 are pulled through the folded liner 30 from the downstream end 26 to the upstream end 24. Where the liner 30 is too small to permit the pull wire 74 and air and steam hoses 80 and 82 to be pulled through the liner 30 in its completely folded state, the liner 30 may be slightly expanded by pressurizing it with steam to increase its cross section. Preferably, no more than four to five psia steam is employed to ensure that the liner does not fully expand and trap residual effluent between the liner 30 and the inside wall 86 of the pipe 10, to form blisters. The pull wire 74 and air and steam lines 80 and 82 are connected to a floating plug assembly 90, either within or above the upstream manhole 14. The assembly 90 is shown in more detail in FIGS. 5–7.

Figure 5:
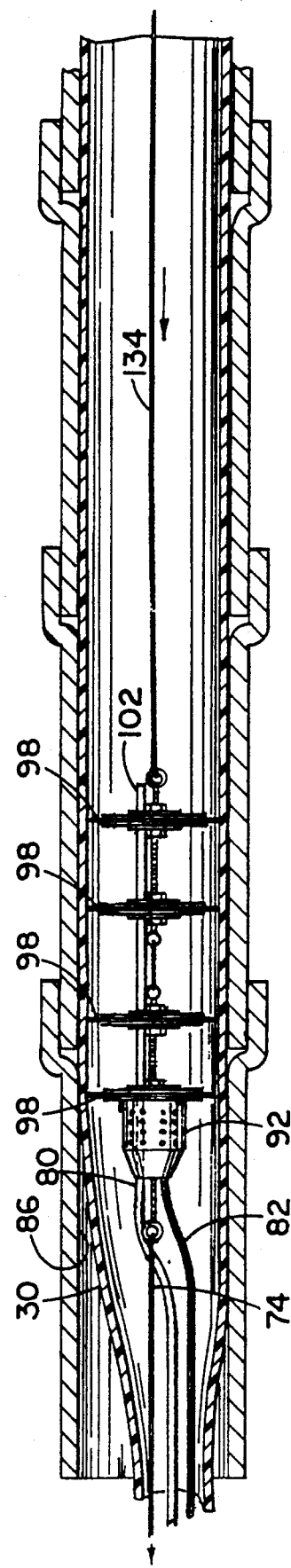
FIG. 5 is an enlarged segmental view of FIG. 4.

The assembly 90 includes a perforated end at least slightly tapered or conical steam head having 92 an I-bolt 94 for attaching the pull wire 74. A multiplicity of steam holes 96 is provided around the circumferential surface of a main cylindrical body portion of the steam head 92. The steam hose 82 is attached to the steam head 92 with its discharge end within the interior of the steam head, so that when steam is supplied through the hose 82, it is ejected through the steam apertures 96 to heat and soften the liner 30 downstream of the first of two or more of the disk shaped expanders 98. The air hose 80 is led through apertures 100 in the expanders 98, as illustrated in FIGS. 5 and 6, so that its discharge end 102 is upstream of the last of the disk shaped expanders 98.

The construction of the expanders 98 is most readily apparent from FIGS. 6 and 7. Each expander 98 is preferably assembled on a threaded rod 106, and includes, moving from the upstream end to the downstream end, a first nut 110, a steel backing plate or washer 112 having an outside diameter larger than the nut 110, but smaller than the overall diameter of the expander 98, preferably a first high temperature rubber disk 114 having a diameter slightly smaller than the inside diameter of the sewer pipe, a primary high temperature rubber expanding disk 116 having a diameter substantially equal to the inside diameter of the sewer pipe 10 with a slight allowance for the thickness of the liner 30; a downstream smaller rubber disk 118, a second steel backup plate 120, and a downstream nut 122. The backing plates 112 and 120 together with the rubber disks 114 and 118 function to stiffen the expander disk 116 and are selected to provide the desired rigidity for the expander disk. An airline opening 100 is formed through the assembly, to allow the discharge end 102 of the airline to be disposed upstream of the last expander 98.

Preferably, assemblies of two expanders are formed on a single threaded rod 106, and adjacent assemblies are coupled by a strong flexible connection 130. This allows the floating plug assembly to be bent and inserted into the liner 30 within what may be a relatively small upstream manhole 14.

The floating plug assembly 90 is installed into the upstream end 72 of the liner 30 by turning on the steam source 182 to soften the liner 30 downstream of the plug assembly 90, as the assembly is inserted from the upstream end 72. After the last of the expander disk assemblies 98 has entered the upstream end of the liner 30, a safety cable 134 is attached to an I-bolt 136 at the trailing end of the floating plug assembly. The safety cable 134 is passed through a stationary upstream plug 140, as most clearly shown in FIG. 8. An air pressure control tube 142 is threaded into the plug 140 and led to a gauge 144 and control valve 146 outside the upstream manhole 14, as seen in FIG. 4. The plug 140 is preferably secured by a conventional clamp 150 around the outside of the upstream liner.

Once the upstream end 72 of liner 30 is sealed, air pressure is applied to hose 80 from a source 184 and exists discharge end 102 behind (upstream) of the plug assembly 90.

The cooling air pressure within the liner section between the floating plug assembly 90 and the upstream end 72 is controlled by the valve 146. It will be appreciated that the liner 30 is conformed to the inside surface 86 of the pipe 10 through the action of the expanders 98, not by being pressurized. This ensures that the liner 30 is progressively conformed to the inside surface of the pipe 10, as the floating plug assembly 90 is drawn from the upstream end 72 to the downstream end 70. Any tendency of prior art methods to trap effluent between the liner and the pipe, as large sections of the liner are pressurized to conform it to the inside surface of the pipe, are eliminated.

As the floating plug assembly 90 is drawn through the liner 30 by the pull wire 74, steam from the steam head 92 is projected radially, and heats and softens the liner 30 in front of the first of the disk shaped expanders 98. The expanders 98 conform the liner 30 to the inside surface 86 of the pipe 10, in a progressive manner, as the assembly 90 is pulled from the upstream end 24 to the downstream end 26 of the pipe 10. The two or more expanders 98 conform the liner 30 to the inside surface 86 of the pipe 10, and create a squeegee type action between the outside wall of the liner 30 and the inside surface 86 of the pipe 10 that progressively pushes any residual effluent 60 in front of the advancing assembly 90 and out the downstream end 26 of the sewer pipe 10. The preferably cool air emitted from the air hose 80 pressurizes the liner 30 upstream of the assembly 90, while simultaneously cooling the liner to a temperature where it remains stable.

After the floating plug assembly 90 has been drawn through the entire length of the liner 30, the plug assembly 90 is removed, to produce a lined pipe section as shown in FIG. 9, the lining 30 is then opened at the previously located lateral services 150 in known fashion, and the ends of the liner 30 are trimmed. The sewer line is then put back into service.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A process for installing a liner in a generally horizontal pipe section having an upstream end and a downstream end comprising the steps of:
   providing a hollow, generally cylindrical folded liner having a cross section sized to allow the liner to fit slidably within the pipe;
   pulling the folded liner through the pipe section, leaving end sections of the liner extending from the upstream end and the downstream end of the pipe section;
   pulling an air hose and a steam hose through the folded liner from the downstream end to the upstream end;
   providing a floating plug assembly including at least two disk shaped expanders;
   attaching the steam hose to the floating plug assembly downstream of the disk shaped expanders;
   attaching the air hose to the floating plug assembly upstream of the disk shaped expanders;
   inserting the floating plug assembly into the liner at the upstream end;
   providing steam to the steam hose and cooling air to the air hose while pulling the floating plug assembly through the liner to progressively heat the liner to a softening point, downstream of the disk shaped expanders, expand the liner to fill the pipe, and cool the expanded liner upstream of the disk shaped expanders.

2. The process of claim 1, comprising the additional step of plugging the upstream end of the pipe between the inserting step and the providing steam step with a stationary upstream plug.

3. The process of claim 2, comprising the additional step of controlling the pressure between the floating plug assembly and the upstream end of the liner by bleeding air through the stationary upstream plug.

4. The process of claim 3, wherein said controlling step comprises providing pressure measuring means and controllable valve means, and controllably actuating the controllable valve means to maintain a desired pressure, as indicated by the pressure measuring means.

5. The process of claim 1, comprising the further step of softening the folded liner prior to pulling the liner through the pipe section.

6. The process of claim 5, comprising the further step of partially opening the liner by pressurizing the liner with steam.

7. The process of claim 1, in which providing a floating plug assembly step includes providing a sliding plug assembly having n at least partially tapered steam head disposed downstream of the disk shaped expander.

8. The process of claim 7, in which the steam head comprises a plurality of steam apertures, and in which the steam hose is coupled to the steam head for emitting steam through the steam apertures.

* * * * *